(12) United States Patent
Fuhrmann

(10) Patent No.: US 9,517,820 B2
(45) Date of Patent: Dec. 13, 2016

(54) DEVICE FOR SECURING FLOATING BODIES

(71) Applicant: DUAL DOCKER GmbH, Munderfing (AT)

(72) Inventor: Michael Fuhrmann, Munderfing (AT)

(73) Assignee: DUAL DOCKER GmbH, Munderfing (AT)

( * ) Notice: Subject to any disclaimer, the term of this patent is extended or adjusted under 35 U.S.C. 154(b) by 0 days.

(21) Appl. No.: 14/759,766

(22) PCT Filed: Jan. 9, 2014

(86) PCT No.: PCT/AT2014/050005
§ 371 (c)(1),
(2) Date: Jul. 8, 2015

(87) PCT Pub. No.: WO2014/110611
PCT Pub. Date: Jul. 24, 2014

(65) Prior Publication Data
US 2015/0353172 A1    Dec. 10, 2015

(30) Foreign Application Priority Data

Jan. 17, 2013   (AT) .............................. A 50028/2013

(51) Int. Cl.
*B63C 1/02*        (2006.01)
*B63B 21/00*       (2006.01)
(Continued)

(52) U.S. Cl.
CPC ............... *B63C 1/02* (2013.01); *B63B 21/00* (2013.01); *E02B 3/064* (2013.01); *B63B 35/34* (2013.01); *B63B 2021/001* (2013.01)

(58) Field of Classification Search
CPC ................................... B63C 1/02; B63B 21/00
(Continued)

(56) References Cited

U.S. PATENT DOCUMENTS 2,481,821 A *  9/1949  Byrne ..................... B63B 35/34
                                                114/266
3,024,753 A *  3/1962  Benson, Jr. ............ E02B 3/064
                                                114/263
(Continued)

FOREIGN PATENT DOCUMENTS

| DE | 1 801 694 A1 | 6/1970 |
| WO | 2009/015403 A1 | 2/2009 |
| WO | 2009/073897 A2 | 6/2009 |

OTHER PUBLICATIONS

International Search Report of PCT/AT2014/050005, mailed May 22, 2014.

*Primary Examiner* — Lars A Olson
*Assistant Examiner* — Jovon Hayes
(74) *Attorney, Agent, or Firm* — Collard & Roe, P.C.

(57) ABSTRACT

The invention relates to a device for securing floating bodies (1), in particular platforms and boats, comprising at least one floating dock (2) with at least one buoyancy element (3), a path structure (4), and a framework-like underwater structure (5). In order to provide advantageous disembarkation conditions, the path structure (4) and the framework-like underwater structure (5) of the floating dock (2) are connected to each other via pendulum supports (6) and are braced via pulling means (7), in particular cables and/or claims.

10 Claims, 4 Drawing Sheets

(51) Int. Cl.
*E02B 3/06* (2006.01)
*B63B 35/34* (2006.01)

(58) Field of Classification Search
USPC .......................................................... 114/263
See application file for complete search history.

(56) References Cited

U.S. PATENT DOCUMENTS

| | | | | | |
|---|---|---|---|---|---|
| 3,289,621 | A | * | 12/1966 | Sebring | B63B 9/00 114/266 |
| 3,455,115 | A | * | 7/1969 | Ellis | E02B 3/064 114/266 |
| 3,635,181 | A | * | 1/1972 | Epple | E02B 3/064 114/266 |
| 4,206,717 | A | * | 6/1980 | Okuda | B63B 21/00 114/230.18 |
| 4,554,883 | A | * | 11/1985 | Lane | B63B 9/065 114/266 |
| 5,107,784 | A | * | 4/1992 | Lacy | B63B 35/34 114/263 |
| 6,558,083 | B1 | * | 5/2003 | Quandt | E02B 3/068 114/44 |
| 7,461,611 | B2 | * | 12/2008 | Hebden | E01D 15/24 114/263 |
| 7,603,959 | B1 | * | 10/2009 | Veazey | B63B 3/08 114/263 |
| 8,109,222 | B2 | * | 2/2012 | Fuhrmann | B63B 21/00 114/230.15 |
| 2007/0283866 | A1 | * | 12/2007 | Veazey | A01K 61/005 114/77 R |
| 2015/0353172 | A1 | * | 12/2015 | Fuhrmann | B63B 21/00 114/263 |

\* cited by examiner

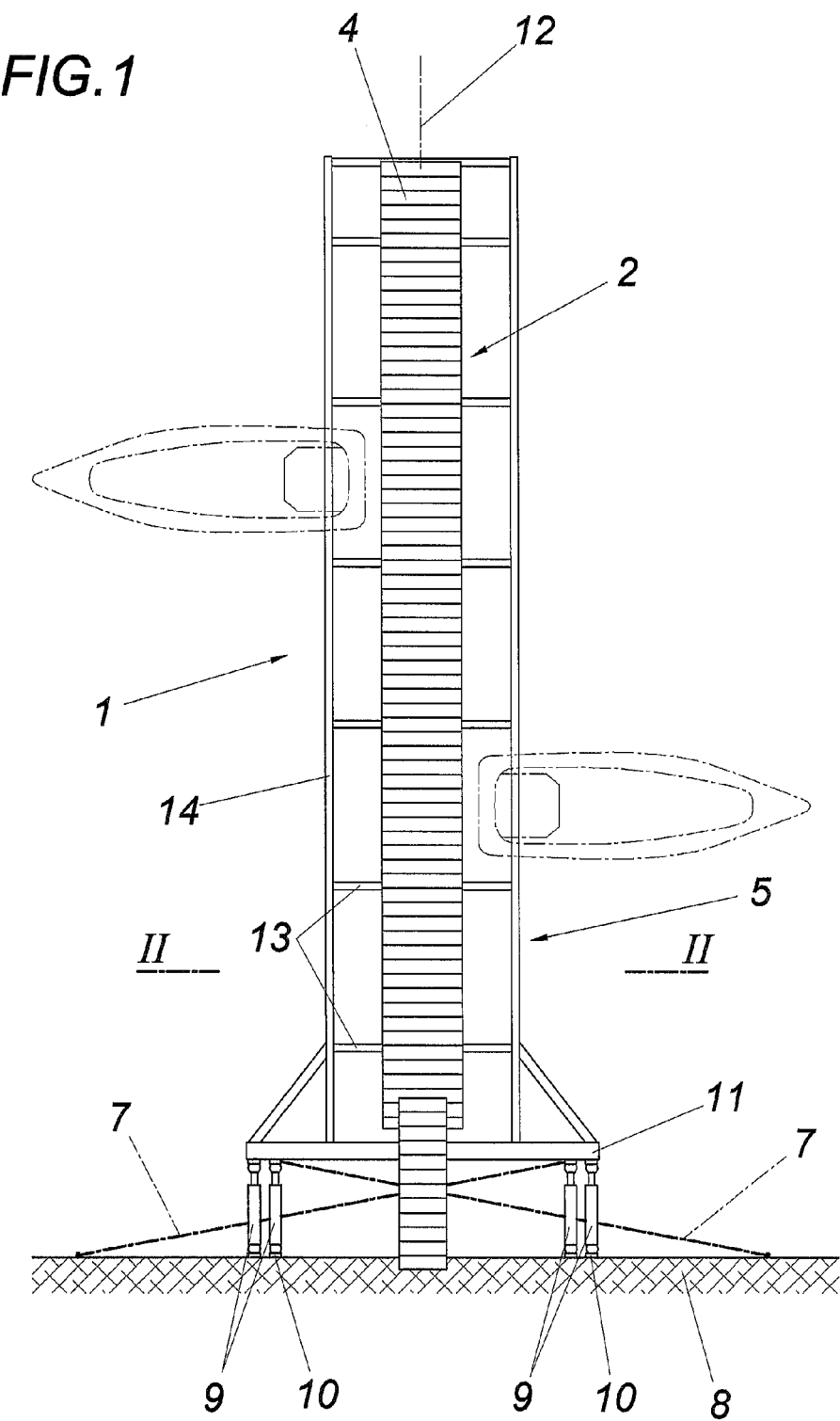

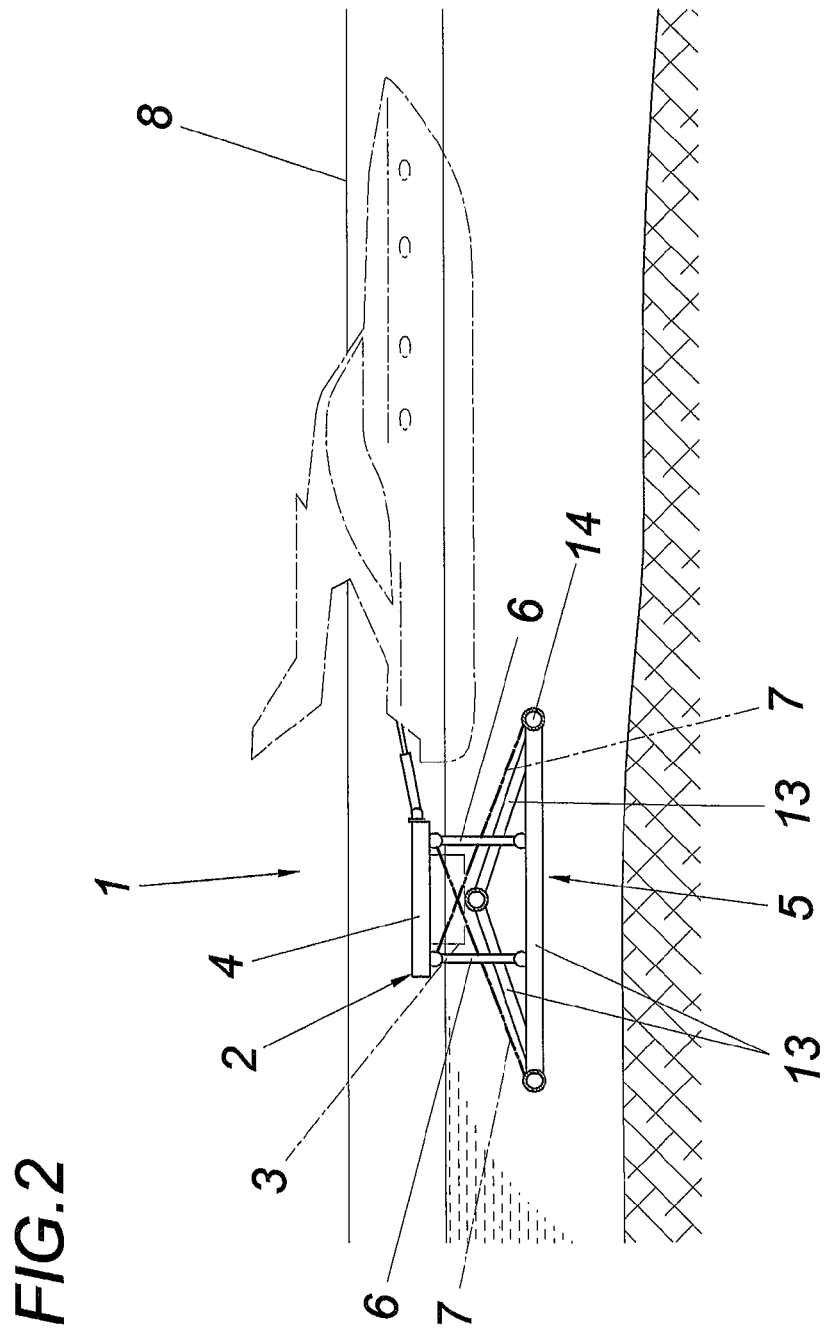

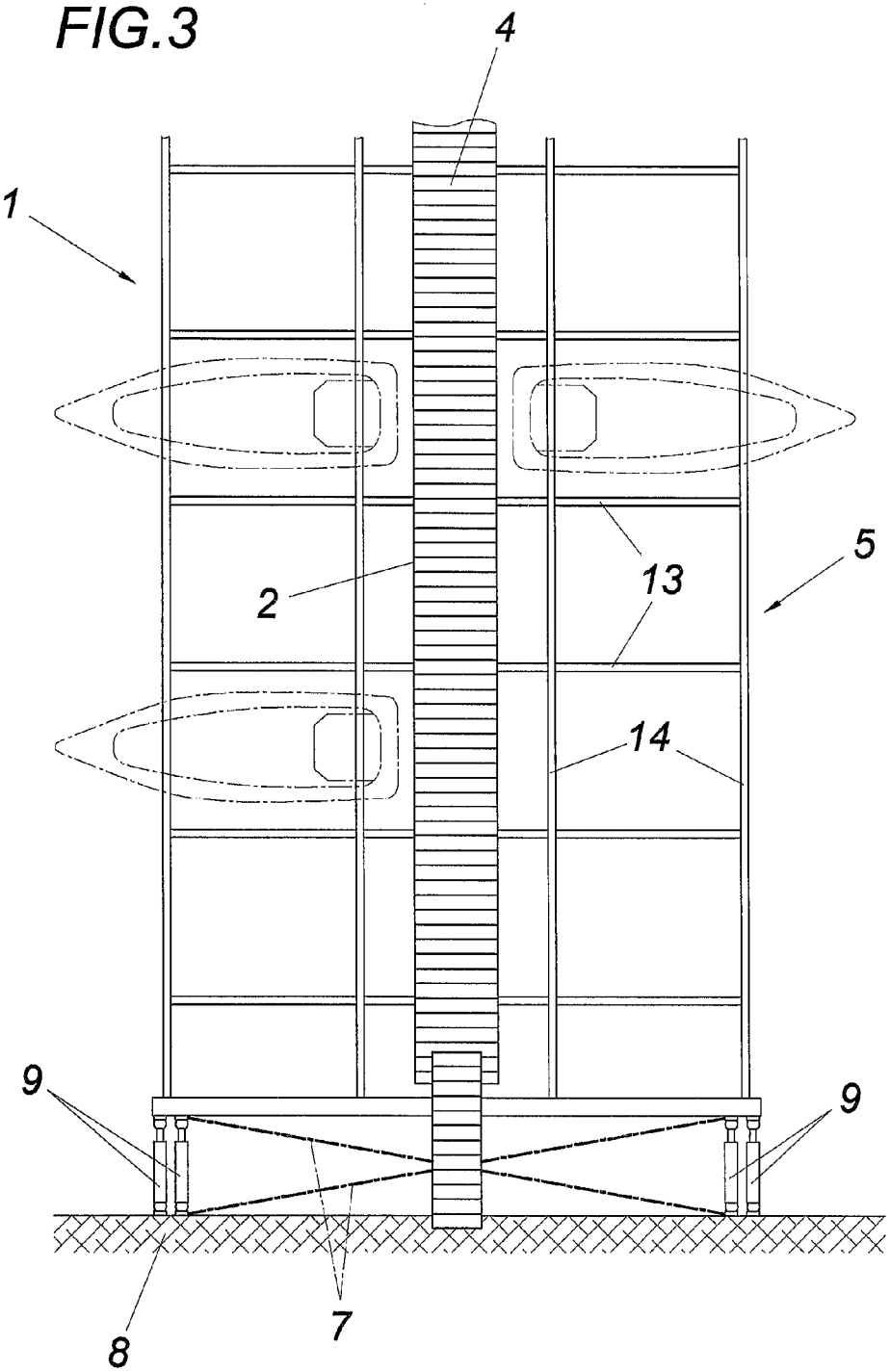

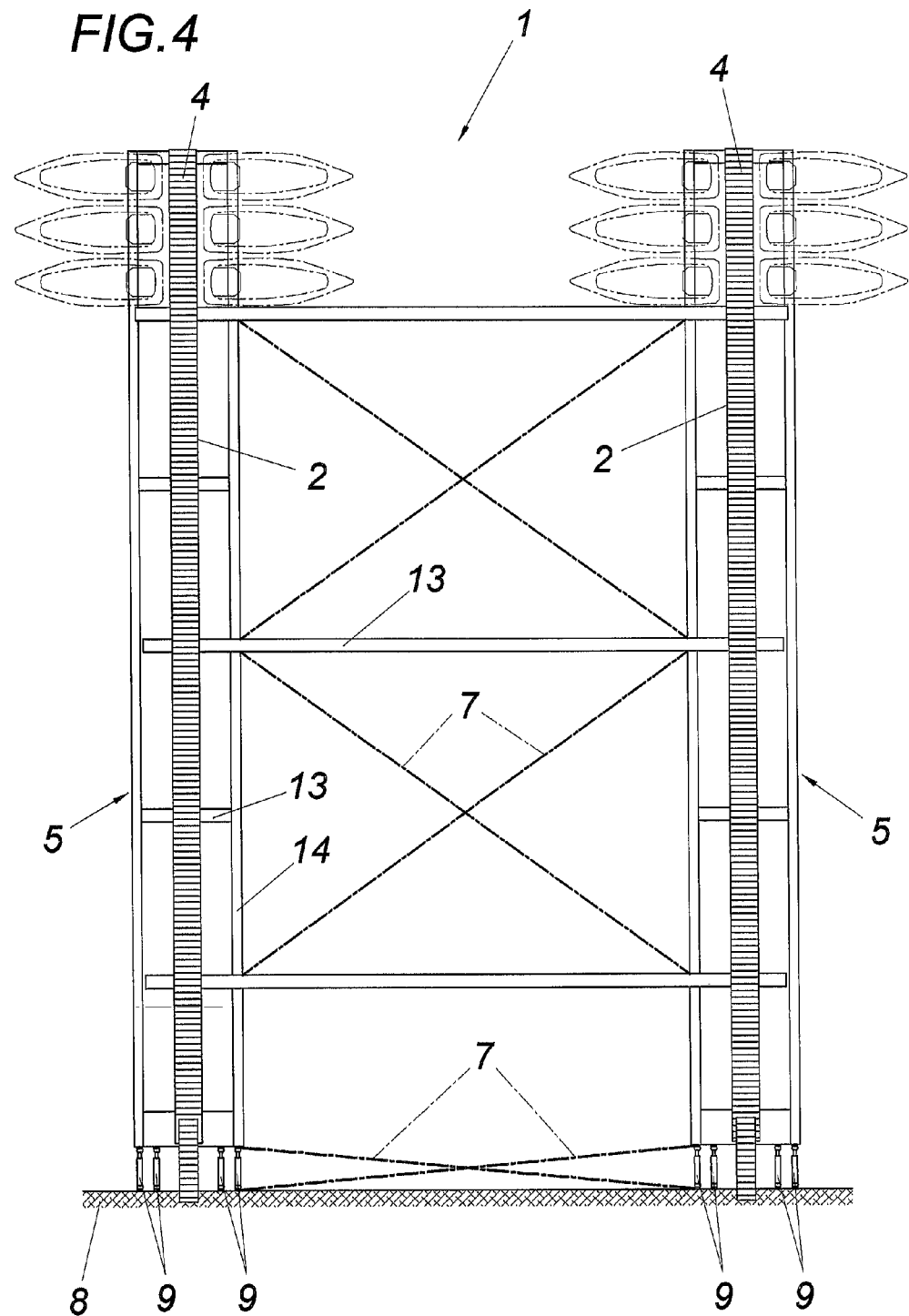

DEVICE FOR SECURING FLOATING BODIES

CROSS REFERENCE TO RELATED APPLICATIONS

This application is the National Stage of PCT/AT2014/050005 filed on Jan. 9, 2014, which claims priority under 35 U.S.C. §119 of Austrian Application No. A50028/2013 filed on Jan. 17, 2013, the disclosures of which are incorporated by reference. The international application under PCT article 21(2) was not published in English.

1. FIELD OF THE INVENTION

The invention relates to a device for securing floating bodies, in particular boats, having a floating dock having at least one buoyant element, having a path structure, and having a framework-like underwater structure.

2. DESCRIPTION OF THE PRIOR ART

Floating docks are structures which float on the water, and on which, for example, arbitrary floating bodies can in turn be fixed, such as ships, boats, sporting equipment, and the like. Floating docks are used in bodies of water having tidal range as water-level-independent docking points and in harbors, inter alia, also for providing as many berths as possible in a constricted space. The buoyant elements, of which a plurality is typically provided, so as not to have to immediately accept the loss of the entire floating dock in the event of loss of one or several buoyant elements, can be manufactured from any arbitrary suitable material, for example, from steel, aluminum, concrete, or plastic.

Wooden boards, plastic boards or slabs, gratings, sheet-metal profiles or plates are provided as floor coverings for the path structure. In the case of buoyant elements made of concrete or steel, the buoyant element can simultaneously represent the floor covering. Floating docks having buoyant elements made of aluminum and plastic generally have a substructure for fastening the floor covering. Substructure and floor covering are parts of the path construction, which typically in turn rest directly on the buoyant elements, which are optionally embedded in a framework-like underwater structure. Presently, floating docks are installed in particular between piles, or anchored and secured using traction means, in particular using chains or cables, on the floor of the body of water, which is problematic in the case of large tidal ranges, however. Chains or cables represent traction means which are mutually interchangeable as needed at any time for the present invention, and are synonymous with all suitable traction means which can only transmit traction forces.

Securing floating bodies of all types, in particular continuing docks, ships, boats, sporting equipment, or the like is typically performed by mooring the respective floating body on the floating dock, wherein a floating body is typically docked either longitudinally or transversely in relation to the floating dock. However, this prior art has the disadvantage that the floating dock lies uneasily on the water, in particular in the event of difficult conditions, and executes substantial intrinsic movements as it follows the wave movements, in particular diverse bends and twists, which means an excess load for all participating components, such as floating dock, the docked floating bodies, and the mooring points.

Furthermore, fastening floating bodies by means of holding trees on docks, harbor walls, or the like is known (WO 2009 015403 A1), wherein the holding docks are fixed at least at one end on the respective mooring point so they are rotationally fixed or rotationally springy about an at least approximately vertical axis using a fitting. The distance of the floating body to the landing body is fixed using the two holding trees, wherein drifting away of the floating body toward the side and diagonally to the rear in the direction of the landing body is suppressed by a rotationally-fixed or rotationally-springy securing of the fittings at one end of the holding trees and/or by securing the holding trees using spring lines. Therefore, wave and wind forces acting on the floating body are introduced directly via the holding trees into the landing body. Forces acting on the floating body, in particular in the event of greater wind strengths and larger waves, can therefore already be cushioned and absorbed at the beginning, whereby a substantially lower strain of floating body and landing body is provided.

SUMMARY OF THE INVENTION

The invention is based on the object, proceeding from the prior art of the above-described type, of providing a device for securing floating bodies, which is sufficiently robust with the simplest possible construction and still lies comparatively calmly on the water even in the event of difficult conditions, in particular in the event of wind and waves. According to one refinement of the invention, the floating dock is particularly advantageously to be able to be fixed securely and fixed in location on a landing body.

The invention achieves this object in that the path structure and the framework-like underwater structure of the floating dock are connected to one another via pendulum supports and are braced via traction means, in particular cables and/or chains.

A device, in particular a floating dock, is provided by the invention, which still lies comparatively calmly on the water even in the event of extremely difficult conditions with respect to wind and waves. This is in particular because the framework-like underwater construction is arranged at a distance under the path construction and thus comes to rest in calmer water depths. The wave amplitudes and therefore the forces acting on the underwater structure or on the floating dock decrease with increasing water depth. The underwater structure lying in calmer waters is connected to the path structure associated with the water surface via pendulum supports, which are only to absorb traction and compression forces per se and which hold the framework-like underwater structure and the path structure at a defined distance to one another. To reduce and damp movements in the path structure, it is braced with the underwater structure via traction means, in particular cables, chains, or the like. Underwater structure and path structure are connected under pre-tension to the traction means, such that a certain compensation movement of the floating dock is possible, but free movements of the two structures, i.e., the path structure and the underwater structure, in relation to one another are absorbed or prevented. This causes substantial damping of movements in the path structure resting on the water surface, whereby nearly similar conditions are provided for the floating dock as for a fixed dock anchored on pylons, for example, which cannot compensate for tidal range, however. A floating dock implemented according to the invention therefore lies, in the event of appropriate embodiment, approximately as calmly as a fixed dock in unsteady conditions.

However, since not only the floating dock itself is to be advantageously implemented, it can optionally be fixed in its location on the floor of the body of water using heavy anchors, chains, or the like, but rather it is also advantageously to be able to be fastened on a landing body, in particular on a pier or the like, it is proposed that the floating dock be fixed on a landing body with at least two holding trees, which each engage at one end on the floating dock and at the other end on the landing body. It is advantageous in this case if the holding trees, which are fixed on mooring points, in particular by means of fittings, consist of two subtrees telescopically displaceable one inside the other, which are braced against one another by a spring unit which absorbs traction and compression forces acting on the holding tree. A floating dock fastened in this manner on the landing body has the advantage that holding forces to be dissipated in the landing body can already be absorbed and cushioned without play at the beginning, whereby excess strain of the entire device can be avoided, in particular the anchoring of the holding trees and the floating dock. If the holding trees are designed as telescopic, which does not necessarily have to be provided, the possibility exists of cushioning and absorbing compensation movements in a controlled manner to a certain extent via spring units provided in the holding tree and optional additionally provided damping units. The holding trees can engage in this case at any arbitrary point of the floating dock.

In the event of concern about particularly large loads to be dissipated, it is advantageous to have the holding trees engage at one end on the framework-like underwater structure, which is optionally widened transversely to the dock toward the landing body, and at the other end on the landing body. As already mentioned, the underwater structure only executes movements of substantially lower amplitude, if any at all, than a floating body which floats freely on the surface would do. However, this also means that the forces to be dissipated via the underwater structure into the landing body, for example, the pier, are less and extreme load spikes can therefore be avoided.

The framework-like underwater structure can widen in this case toward the landing body, which means that the underwater holding trees can be arranged at a greater distance to one another, whereby in turn the forces to be transmitted via the holding trees are reduced, since the distance of the holding trees to the floating dock longitudinal axis is enlarged and any possible transverse forces acting on the dock therefore also cause lesser perpendicular forces in the holding trees.

In particular, it is advantageous if the framework-like underwater structure has a width which protrudes beyond the path width. Particularly stable floating dock systems may therefore be provided, wherein a sufficient amount of free space for docked floating bodies is provided if the underwater structure is arranged appropriately deeply below the water surface. In addition, underwater structure and path structure can therefore advantageously be mutually braced.

The floating dock, in particular the underwater structure and the landing body, is also typically secured by means of crossing traction means, in particular cables and/or chains. These securing traction means in particular absorb transverse forces acting on the floating dock and dissipate them into the landing body.

An advantageous structure, which is stable with comparatively low weight, for the underwater structure results if it consists of a rib framework having transverse ribs aligned transversely to the dock longitudinal direction and having longitudinal ribs connecting the transverse ribs. The individual ribs are secured against one another in this case by means of traction means, for example, to ensure sufficient torsion and bending stiffness of the underwater structure. The ribs and traction means therefore similarly offer components of the framework-like underwater structure. The transverse ribs can span a triangle in this case, for example, which is connected or braced via the pendulum supports and the cables with the path structure. The securing is preferably performed in this case in that the rib structure is secured in itself and/or with the path structure using cables engaging at node points of the rib structure.

The buoyant elements are typically associated with the path structure. To reduce the buoyant forces in the region of the water surface, for the above-mentioned reasons, at least a part of the buoyant elements can be designed as part of the framework-like underwater structure. For example, individual ribs of the underwater structure can be tubes which are closed watertight and filled with air, foam, or the like.

BRIEF DESCRIPTION OF THE DRAWING

The subject matter of the invention is illustrated as an example in the drawing. In the figures:

FIG. 1 shows a device according to the invention in a top view,

FIG. 2 shows the device from FIG. 1 in section along line II-II,

FIG. 3 shows a structure variant of the device according to the invention in a top view, and FIG. 4 shows a further structure variant in a top view.

DESCRIPTION OF THE PREFERRED EMBODIMENT

The device according to the invention for securing floating bodies 1 comprises a floating dock 2 having at least one buoyant element 3, having a path structure 4, and having a framework-like underwater structure 5.

The path structure 4 has a typical floor covering made of wooden boards or the like and is connected to the framework-like underwater structure 5 of the floating dock 2 via pendulum supports 6 and braced via traction means 7.

The floating dock 2 is fixed on a landing body 8, a pier, harbor wall, or the like, using at least two holding trees 9, which each engage at one end on the floating dock 2 and at the other end on the landing body 8. The holding trees 9, which are fixed in particular by means of fittings, particularly preferably ball couplings, on the mooring points 10, consist of two subtrees displaceable one inside the other telescopically, which are braced against one another by a spring unit, which absorbs traction and compression forces acting on the holding tree 9.

The holding trees 9 engage at one end on the framework-like underwater structure 5, which widens transversely in relation to the dock, i.e., in relation to the floating dock longitudinal direction, toward the landing body, and at the other end on the landing body 8. The mentioned widening of the underwater structure 5 toward the landing body 8 is indicated by a transverse bar 11. In addition, it can be inferred from the figures that the framework-like underwater structure 5 has a width which protrudes beyond the path width, i.e., the width of the path structure.

The floating dock 2, in particular the underwater structure 5 and the landing body 8, are braced by means of crossing traction means 7. The holding trees 6 are designed as pendulum supports and are linked in particular via joints at one end on the floating dock 2 and at the other end on the landing body 8. The framework-like underwater structure 5 consists of a rib framework having transverse ribs 13 aligned transversely to the dock latitudinal direction 12 and having, longitudinal ribs 14 connecting the transverse ribs 13. In particular, the transverse ribs 13 span a triangle, which is connected via the pendulum supports 6 and the cables 7 to the path structure 4. The rib structure is secured per se and with the path structure 4 in this case using cables 7 engaging at the node points of the rib structure. However, the transverse ribs 13 can also be designed as exiting bodies of the longitudinal ribs 14 in particular, for example.

The invention claimed is:

1. A device for securing floating bodies having at least one floating dock having at least one buoyant element, having a path structure, and having a framework-shaped underwater structure, wherein the path structure and the framework-shaped underwater structure of the floating dock are connected to one another via pendulum supports and are braced via a traction device comprising cables and/or chains.

2. The device according to claim 1, wherein the floating dock is fixed on a landing body using at least two holding trees, which each engage at one end on the floating dock and at the other end on the landing body, wherein the holding trees, which are fixed on mooring points, comprise two subtrees displaceable one inside another telescopically, which are braced against one another by a spring unit which absorbs traction and compression forces acting on the holding tree.

3. The device according to claim 2, wherein the holding trees engage at one end on the framework-shaped underwater structure, which is optionally widened transversely to a web toward the landing body, and at the other end on the landing body.

4. The device according to claim 1, wherein the framework-shaped underwater structure has a width which protrudes beyond the path width.

5. The device according to claim 2, wherein the floating dock and the landing body are secured by crossing traction devices comprising cables and/or chains.

6. The device according to claim 2, wherein the holding trees are designed as pendulum supports and engage at one end on the floating dock and at the other end on the landing body.

7. The device according to claim 1, wherein the framework-shaped underwater structure comprises a rib framework having transverse ribs aligned transversely to the dock longitudinal direction and longitudinal ribs connecting the transverse ribs.

8. The device according to claim 7, wherein the traction device comprises cables and the transverse ribs span a triangle which is connected via the pendulum support and the cables to the path structure.

9. The device according to claim 7, wherein the traction device comprises cables and the rib framework is secured per se and/or with the path structure using the cables engaging at node points of the rib framework.

10. The device according to claim 1, wherein at least parts of the framework-shaped underwater structure are designed as the buoyant elements.

\* \* \* \* \*